G. R. WILLIAMS.
Bale Weighing Scale.

No. 201,972. Patented April 2, 1878.

WITNESSES:
Henry N. Miller
C. Sedgwick

INVENTOR:
G. R. Williams
BY Munn & Co
ATTORNEYS.

UNITED STATES PATENT OFFICE.

GEORGE R. WILLIAMS, OF DARDANELLE, ARKANSAS.

IMPROVEMENT IN BALE-WEIGHING SCALES.

Specification forming part of Letters Patent No. 201,972, dated April 2, 1878; application filed March 5, 1878.

*To all whom it may concern:*

Figure 1:
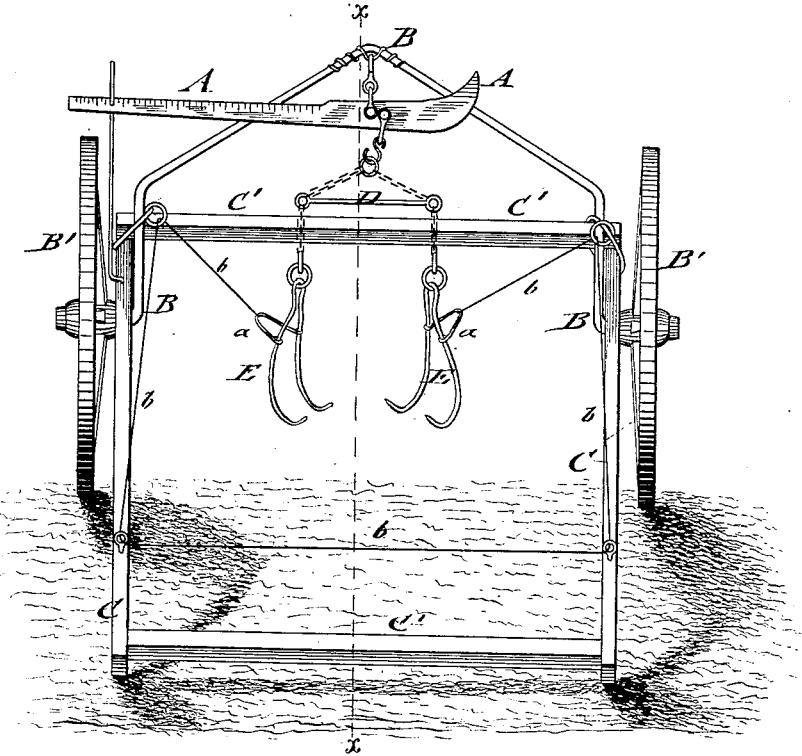
Figure 2:
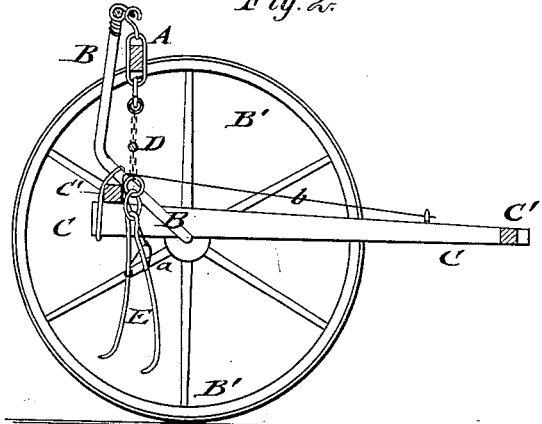

Be it known that I, GEORGE R. WILLIAMS, of Dardanelle, in the county of Yell and State of Arkansas, have invented a new and Improved Portable Bale-Weighing Scale, of which the following is a specification:

In the accompanying drawing, Figure 1 represents a front elevation of my improved bale-weighing scale; and Fig. 2, a vertical longitudinal section of the same on line $x\,x$, Fig. 1.

Similar letters of reference indicate corresponding parts.

The object of this invention is to furnish an improved device for weighing cotton and other bales, in convenient manner, by placing the beam on wheels, so that it may be carried to the bale, furnishing, together with the leverage of the wheel-frame, a more convenient method of weighing cotton-bales than the present four-legged frame, which has to be lifted from one bale to another.

The invention consists of the beam-scale being suspended from the yoke-shaped center portion of the axle of the supporting-wheels, to which a handle-frame is attached by which the bale is readily raised or lowered. From the beam are suspended, by cross-bar and chains, V-shaped hooks that take hold of the bale. The hooks are spread apart or lowered to the bale by governing-cords, running in rings or pulleys of the handle-frame.

Referring to the drawing, A represents a graduated beam, which is hung to the center or uppermost point of the central angular yoke portion of the axle B, to the outer ends of which the supporting-wheels B' are applied. The wheels serve the twofold purpose of providing a support for beam, as well as a convenient means of making the entire scale portable.

To the angles of the yoke portion with the inclined side portions of the axle is attached the handle or shaft frame C, by which the device is controlled as a vehicle, and which also acts as a lever to raise or lower the bale suspended from the beam, the axle ends and hubs of the supporting-wheels forming the fulcrums of the handle-frame. The handles or shafts are stiffened by front and rear cross-pieces C', of which the latter serves to attach the handles to the axle.

To the beam is attached, by suspending-chains, a cross-bar, D, from which, by shorter chains, the curved and V-shaped suspension-hooks E of the bale are hung. The rear cross-piece C' serves also as a means of keeping the weight or bale within the necessary distance of the fulcrum of the lever-frame. The angular yoke is so arranged that after the bale is raised to the necessary height its whole weight is gradually transferred to the beam, and is carried over until its center of gravity is between the fulcrum and the power applied to the handle-frame.

To the suspension-hooks E are attached, by connecting-links $a$, cords $b$, that pass through rings at the side and front part of the handle-frame, extending across the same near the front part thereof, so that the device may be readily taken hold of by one hand and raised from the ground, while the other hand takes hold of the cross-cord and pulls the hooks sidewise to such a distance from each other that they pass readily over the bale. The handle-frame is then raised until the rear cross-piece C' of the handle-frame touches the bale. The wheels are then moved forward and backward, as necessary, for adjusting the cross-piece to the center of the bale. The cords are then released, so that the hooks will take hold of the bale and admit of its being raised. The handle-frame is then lowered to the ground, where it will stay if the ground is level; if not, then the entire device is turned around until the handle-frame is on the lower side. The sliding pea or weight is then ready to be used on the beam.

The outer end of the beam may be retained by an arm with the upper hooked end secured to the handle-frame when the scale is not in use for weighing purposes.

The portability of the weighing-scale facilitates the moving of the scale to the bales to be weighed, while the leverage of the handle-frame on the axle of the device and the regulating of the suspension-hooks facilitate a convenient taking hold of the bale for raising and lowering and weighing the same.

Having thus described my invention, I claim as new and desire to secure by Letters Patent—

1. The combination, with a weighing-beam, of an angular axle with central yoke supported on wheels, and of an operating handle-frame, substantially as and for the purpose described.

2. The combination of a weighing-beam, suspended from the central or highest point of the angular yoke of the axle, with adjustable suspension-hooks, connected by cross-bar and chains to beam, substantially as described.

3. The combination of the weighing-beam, suspended from the angular yoke of a wheeled handle-frame, with suspension-hooks operated by connecting-cords from the front part of the handle-frame, substantially as and for the purpose set forth.

GEORGE R. WILLIAMS.

Witnesses:
SAM. M. REDBURN,
CHAS. N. MEYERS.